(12) United States Patent
Worsley

(10) Patent No.: US 8,745,730 B1
(45) Date of Patent: Jun. 3, 2014

(54) SECURE COMPUTER PROVISIONING AND OPERATION

(75) Inventor: Timothy C. Worsley, Snoqualmie, WA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

(21) Appl. No.: 13/231,523

(22) Filed: Sep. 13, 2011

(51) Int. Cl.
*G06F 21/00* (2013.01)

(52) U.S. Cl.
USPC ............... 726/21; 726/27; 713/155; 713/156; 713/157; 713/158; 713/159; 380/247; 380/248; 380/249; 380/250

(58) Field of Classification Search
USPC ...................................................... 726/19–25
See application file for complete search history.

(56) References Cited

U.S. PATENT DOCUMENTS

| | | | |
|---|---|---|---|
| 5,680,547 A * | 10/1997 | Chang | 709/222 |
| 5,826,015 A * | 10/1998 | Schmidt | 726/23 |
| 5,892,906 A * | 4/1999 | Chou et al. | 726/19 |
| 6,484,262 B1 * | 11/2002 | Herzi | 726/34 |
| 7,194,619 B2 | 3/2007 | Abbondanzio et al. | |
| 7,313,690 B2 | 12/2007 | Miller | |
| 7,664,834 B2 | 2/2010 | Keith, Jr. | |
| 7,822,863 B2 | 10/2010 | Balfanz et al. | |
| 7,958,506 B2 | 6/2011 | Mann | |
| 8,102,881 B1 | 1/2012 | Vincent | |
| 8,332,490 B2 | 12/2012 | Bozek et al. | |
| 8,381,264 B1 * | 2/2013 | Corddry et al. | 726/3 |
| 2004/0199758 A1 | 10/2004 | Meaney et al. | |
| 2005/0075115 A1 | 4/2005 | Corneille et al. | |
| 2006/0200539 A1 | 9/2006 | Kappler et al. | |
| 2009/0150525 A1 | 6/2009 | Edgett et al. | |
| 2009/0201830 A1 | 8/2009 | Angelot et al. | |
| 2009/0276618 A1 | 11/2009 | Madjlessi | |
| 2010/0017597 A1 | 1/2010 | Chandwani | |
| 2010/0325736 A1 * | 12/2010 | Sadovsky et al. | 726/27 |
| 2011/0125990 A1 | 5/2011 | Khosravi et al. | |
| 2011/0320799 A1 | 12/2011 | Lam | |
| 2012/0011354 A1 | 1/2012 | Owen | |
| 2012/0179900 A1 | 7/2012 | Temporelli | |
| 2012/0272090 A1 | 10/2012 | Poisner | |
| 2012/0322422 A1 | 12/2012 | Frecks, Jr. et al. | |
| 2013/0013910 A1 | 1/2013 | Temporelli et al. | |

OTHER PUBLICATIONS

Office action for U.S. Appl. No. 13/166,641, mailed on Dec. 13, 2012, Worsley, "Secure Computer Provisioning", 11 pages.
Office action for U.S. Appl. No. 13/166,610, mailed on Mar. 26, 2013, Worsley, "Global Computer Provisioning", 12 pages.
Final Office Action for U.S. Appl. No. 13/166,610, mailed on Oct. 11, 2013, Tmothy C. Worsley, "Global Computer Provisioning", 13 pages.

(Continued)

*Primary Examiner* — Ghazal Shehni
(74) *Attorney, Agent, or Firm* — Lee & Hayes, PLLC

(57) ABSTRACT

A networked computer device can be customized to contain provisioning and/or authorization logic in its firmware or the firmware of one of its subcomponents. The computer device is thus configured to provision itself from a provisioning server that is identified within the firmware, and to periodically query an operations authority for continued authorization to operate with the received provisioning. Upon failure to receive authorization, the firmware may implement various security measures, such as storage protection, boot protection, communications protection, and so forth. The firmware may also implement remote reporting, to assist an investigator when a device has been lost or stolen.

28 Claims, 3 Drawing Sheets

(56) References Cited

OTHER PUBLICATIONS

Office action for U.S. Appl. No. 13/166,641, mailed on Jul. 2, 2013, Worsley, "Secure Computer Provisioning", 14 pages.

Office Action for U.S. Appl. No. 13/237,693, mailed on Jan. 30, 2014, Timothy C. Worsley, "Secure Dynamic Network Configuration", 9 pages.

Office Action for U.S. Appl. No. 13/237,644, mailed on Mar. 27, 2014, Timothy C. Worsley, "Mobile Provisioning Device", 7 pages.

* cited by examiner

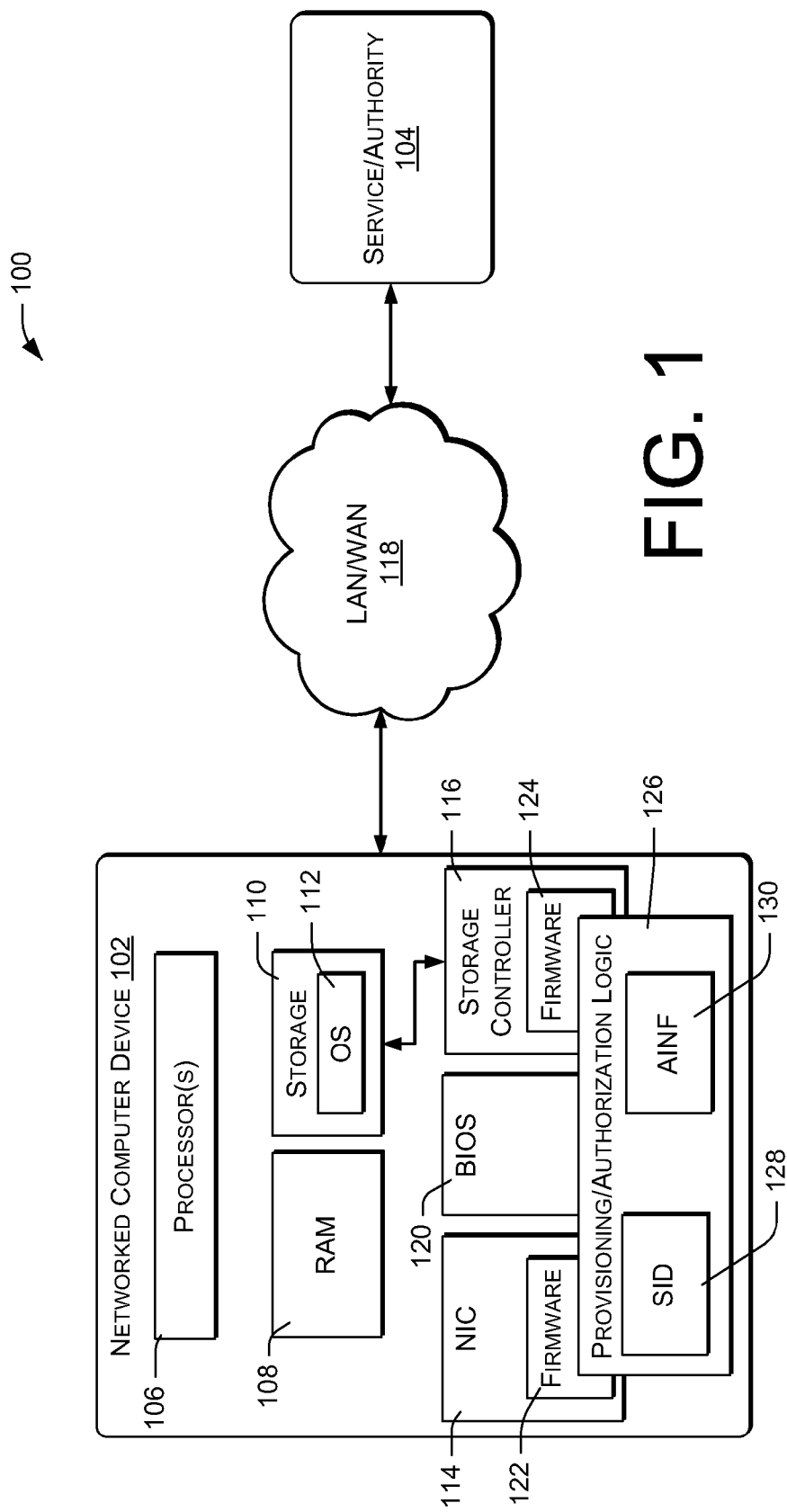

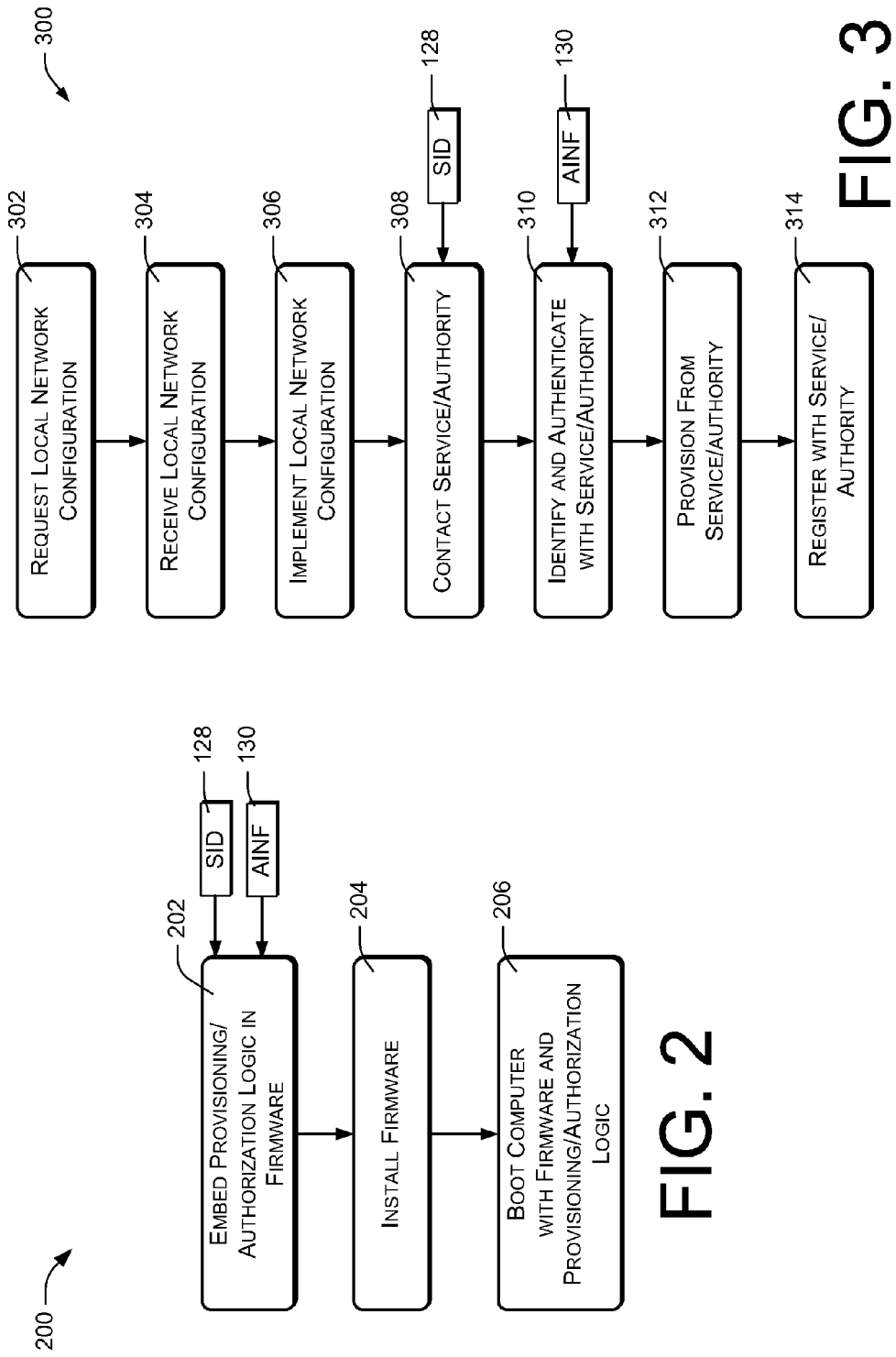

SECURE COMPUTER PROVISIONING AND OPERATION

BACKGROUND

Organizations often provide personal computers for use by their employees. The computers, which increasingly comprise laptop computers and other mobile devices, are typically customized by an organization to operate with software that the organization has licensed, as well as with the particular settings, protocols, and configurations that have been adopted for use within the organization.

The process of initially configuring a computer, particular in large-scale deployments of computers, is referred to as provisioning. Before it becomes operational, each computer is provisioned with the software and settings that are responsible for its operations, including operating systems, utilities, drivers, applications, and so forth.

Computers can be provisioned manually, by technicians or users who supply physical media from which the computers may install selected software. Automated provisioning processes are also used, in which computers automatically utilize a local network connection to download their operating software. There are standard protocols for implementing such automated provisioning, including the Preboot eXecution Environment (PXE).

By provisioning its computers with standardized configurations, an organization can impose security measures on the computers and their users. For example, computers can be configured through provisioning to refuse the installation of unauthorized software, to encrypt stored data, to require passwords or other types of user authentication, and so on.

Despite these security measures, the loss or theft of a computer is usually viewed as a security breach. This is because many security measures can be overcome with enough time and/or effort. Even hard disk encryption, for example, may be defeated if an attacker has physical possession of the computer and is given enough time to break the encryption.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 1 is a block diagram illustrating a system for provisioning networked computers and for authorizing such computers for continued operation.

FIG. 2 is a flow diagram illustrating a method of configuring a computer for provisioning and continued authorization.

FIG. 3 is a flow diagram illustrating a method of securely provisioning a networked computer.

DETAILED DESCRIPTION

Figure 4:
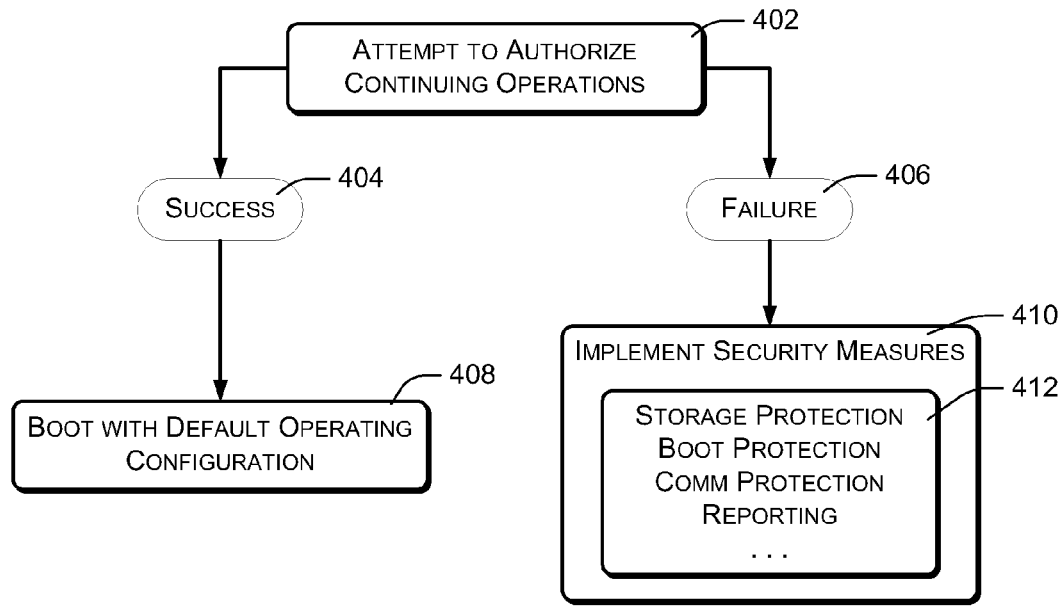
FIG. 4 is a flow diagram illustrating a method of conditioning continued computer operations on receiving authorization from an operations authority.

This disclosure describes systems, devices, and techniques that can be used to provision computers, servers, and other networked devices in network environments that may not be controlled or secure, and to prevent or limit continued operation of such networked devices when they are lost, stolen, or otherwise in the possession of unauthorized or hostile entities.

A computer device typically has a BIOS (Basic Input/Output System), which is the first software executed by the device when powered on. The BIOS may also be referred to as firmware or boot firmware, and different sub-components of a computer device may each have their own BIOS or firmware.

In certain embodiments described herein, the firmware of a computer device is customized to use automated network-based provisioning procedures. In these embodiments, the firmware of the computer device is customized so that it contains a global identification of a specific service/authority from which the computer device is to be provisioned. The service/authority may in some cases be accessible through a wide-area network such as the Internet.

The computer device firmware can be additionally or alternatively configured to verify or confirm the identity of the service/authority using cryptographic authentication techniques or other means. For example, the computer firmware may request that the provisioning server authenticate itself by providing a signature that can be validated using cryptographic techniques. Similarly, the computer device may authenticate itself to the provisioning server by providing a digital signature or other credentials that can be validated by the provisioning server.

After initial provisioning, the computer device firmware is configured to contact the service/authority periodically, such as upon each startup of the computer device, to authenticate with the service/authority, and to obtain authorization for continued operations of the computer device. The service/authority may maintain a central registry of provisioned and authorized computers, and may limit authorization to computers that are indicated by the registry. If a computer is lost or stolen, it may be removed from the central registry so that the computer is no longer able to obtain authorization from the service/authority.

Upon failure to authenticate with and or obtain authorization from the service/authority, the firmware may be configured to implement security measures within the computer device or with respect to individual peripherals of the computer device. Such security measures may include refusing to boot the computer device, refusing access to certain peripherals, erasing or destroying the computer's hard disk, and so forth. Security measures may also, or alternatively, include initiating remote reporting procedures to report computer-related information to the service/authority or some other entity. For example, a keystroke logging program might be initiated to report keystrokes made on the computer device. Depending on the capabilities of the computer device, it may be possible also to report locations of the computer device, accounts accessed by the computer device, network addresses used by the computer device, and so forth. Such reporting may allow investigators to locate and recover the computer device, or to identify the parties who are using the computer device.

FIG. 1 shows an environment 100 in which a networked computer device 102, referred to simply as the computer 102 in the following discussion, is configured to be provisioned and to receive continued authorization for operations from a service/authority 104. The service/authority 104 may be alternatively referred to herein as a provisioning service and/or an operations authority in the following discussion. Furthermore, note that the service/authority 104 performs a variety of services, possibly in addition to these described herein, and that the variety of services may in some embodiments be performed by multiple different entities rather than the single service/authority illustrated.

The computer 102 has one or more processors 106 and associated computer-readable memory comprising random-access memory (RAM) 108 and non-volatile storage 110. The RAM 108 may comprise electronic memory for temporary storage of programs and data. The storage 110 may be a form of non-volatile memory or mass storage, such as a hard disk or non-volatile flash memory. The computer 102 may additionally have other types of computer-readable media, including removable devices such as floppy disks, compact disks, memory cards, and so forth.

The computer-readable memory of the computer 102 stores programs, program modules, routines, drivers, and so forth, which comprise instructions that are accessible and executable by the processor(s) 106 to implement various computer functionality. As an example, an operating system (OS) 112 may be stored by the storage 110 for execution by the processor(s) 106. The OS 112 implements the basic functionality of the computer 102, including user interface elements and other functionality. More specialized applications may also be stored by the storage 110 and executed by the processor(s) 106 upon demand.

The computer 102 may also have various types of hardware interfaces, components, and other peripherals. As an example, FIG. 1 shows a network interface device or card (NIC) 114 and a storage controller 116. The NIC 114 is configured to implement network communications on behalf of the computer 102, such as over a local-area or wide-area network 118. The network 118 may include private networks and public networks such as the Internet. The NIC 114 and network 118 may utilize various types of networking technologies, including wired, wireless, and cellular networking technologies.

The storage controller 116 may be associated with the storage 110, such as may be the case with a hard disk and its associated controller. In some cases, the storage 110 and the storage controller 116 may be elements of an integrated hardware device. In other cases, the storage controller 116 may be part of a computer motherboard to which the storage 110 is connected. The storage controller 116 may provide access by the processor 106 to the storage 110, and may control operations of the storage hardware (such as a hard disk) that is used to implement the storage 110. In some embodiments, the storage controller 116 may perform encryption and decryption of the storage 110.

The computer 102 may have or be associated with various types of boot memory, including firmware. Firmware generally comprises non-volatile computer-readable media or memory containing instructions that are executed by the processor 106 upon startup of the computer 102 or startup of an associated hardware component. For example, the computer 102 may have a system BIOS 120. The system BIOS 120 may comprise non-volatile memory containing instructions that the processor 106 executes upon startup. The BIOS instructions may initialize various subsystems, such as networking systems, storage systems, and so forth. The BIOS may also contain instructions and functionality that are used during normal, non-startup operations of the computer 102.

Various computer peripherals may also have firmware. Note that such firmware may include instructions that are executed for normal operations of the peripherals, as well as boot firmware that is executed upon startup of the peripherals. For example, the NIC 114 may have firmware 122 that is executed upon startup of the computer 102, to initialize the NIC 114. Likewise, the storage controller 116 may have firmware 124 that is executable to initialize storage capabilities of the computer 102. The instructions stored by the firmware 122 and/or 124 may be executed upon startup by the processor(s) 106 or by processors associated with the NIC 114 and storage controller 116. Certain portion of the firmware of the various computer peripherals may also be invoked during normal, post-startup operations of the computer 102.

One or more of the subcomponents of the computer 102 may be configured as boot devices or components. Thus, the system BIOS 120 may be configured to perform low level initializations, and to then look to a peripheral device or subcomponent for higher level instructions. A boot device may contain or provide access to operating software for a computer, such as an operating system. A boot device may also contain or provide access to instructions for provisioning a computer.

In the described embodiment, the computer 102 is configured through its BIOS 120 to initially use the NIC 114 as a boot device, and to provision the computer 102 using the NIC 114. The NIC 114, in turn, is configured by way of its firmware 122 to contact the service/authority 104 through the network 118 for provisioning information and software. The service/authority 104 may be maintained by a business entity to automatically provision its own computers, or may be maintained by a service provider for use by multiple customers of the service provider. The terms "service" and "authority," as used herein, may refer to a single server or a plurality of coordinated servers and/or services.

Conventional communications protocols such as the Internet Protocol (IP) may be used for communication between the various entities shown in FIG. 1. In particular, IP version 4 (IPV4) and/or version 6 (IPV6) may be used in certain embodiments for communications between the computer 102 and the service/authority 104.

The service/authority 104 can be globally identified by its network address. In the Internet environment, the service/authority 104 may be identified by a unique IP address or Universal Resource Locator (URL). Other forms of global identification may also be used to uniquely identify the provisioning service among different network entities that are accessible through the network 118.

The computer 102 may have provisioning/authorization logic 126 embedded within its firmware, such as in the BIOS 120, the firmware 122 of the NIC 114, the firmware 124 of the storage controller 116, and/or the firmware of other components associated with the computer 102. The provisioning/authorization logic 126 is configured to be executed upon computer startup and to initially provision the computer 102 from the service/authority 104. In addition, the provisioning/authorization logic 126 is configured to repeatedly contact the service/authority 104 to obtain authorization for continuing operations of the computer 102, and to at least partially disable the computer 102 upon failure to obtain such authorization.

In some embodiments, the provisioning/authorization logic may contain a service identification (SID) 128 identifying the service/authority 104 from which the computer 102 is to provision itself. The service identification 128 may be an IP address, a URL, or some other type of specification allowing the computer 102 to identify and access the service/authority 104 via the network 118. Thus, upon startup, the computer 102 contacts the service/authority 104 through the network 118 and downloads a boot image. These communications between the computer 102 and the service/authority 104 may utilize PXE communication and file transfer protocols.

The provisioning/authorization logic 126 may in some embodiments be further customized to contain authentication information (ATNF) 130. The authentication information 130 enables the computer 102 to verify the identity of the service/authority 104, and also may allow the computer 102 to authenticate itself with the service/authority 104. Using the authentication information 130, the computer 102 can ensure that it is communicating with the intended service/authority 104. Similarly, the service/authority 104 can ensure that it provisions only authorized computers. The authentication information 130 may also allow the service/authority 104 to reliably identify the computer 102, and to thereby provide customized provisioning information and software for different requesting devices.

As an example, the provisioning/authorization logic 126 may be configured to perform provisioning and authorization in accordance with the techniques described in a co-pending U.S. application Ser. No. 13/166,641, filed on Jun. 22, 2011, entitled "Secure Computer Provisioning" and in a co-pending U.S. application Ser. No. 13/166,610, filed on Jun. 22, 2011, entitled "Global Computer Provisioning," both of which are incorporated herein by reference in their entirety.

The provisioning/authorization logic 126 may be further configured to condition normal operation of the computer 102 upon receiving continuing authorization from the service/authority 104. For example, the provisioning/authorization logic 126 may be configured upon every startup of the computer 102 to contact the service/authority 104, to authenticate with the service/authority 104, and to query the service/authority 104 regarding continued operation under the currently provisioned configuration. Upon failure to receive authorization, the provisioning/authorization logic may limit or disable the computer 102 or its peripherals.

As an example, the BIOS 120 may be configured to refuse to boot the computer 102 upon failure to obtain authorization from a central service such as the service/authority 104. As another example, the storage controller 116 may be configured through its firmware 124 to deny hard disk access unless continuing authorization is obtained from the service/authority 104.

FIG. 2 illustrates a process 200 for configuring, initializing, and/or provisioning a computer or computer-like device. The actions of the process 200 will be described with reference to the elements of FIG. 1, although it is to be understood that the process 200 may also be implemented in other environments, and with respect to other types of devices.

In illustrated embodiment, an action 202 comprises embedding the provisioning/authorization logic 126 in the BIOS firmware 120 of the computer 102 or the firmware of a computer sub-component such the firmware 122 of the NIC 114 or the firmware 124 of the storage controller 116.

The provisioning/authorization logic 126 is configured to contain the service identification 128, which may comprise a numerical network address, such as an IP address. The service identification 128 may alternatively comprise a domain name, URL, or other identifier that can be resolved to an IP address using domain name services (DNS). Other forms of direct and indirect service identifications or addresses may also be used.

The provisioning/authorization logic 126 may be further configured to contain the authentication information 130. The authentication information 130 may comprise cryptographic keys, certificates, signatures, tokens, usernames, passwords, and so forth. The authentication information 130 can be used to authenticate the service/authority 104 as well as to authenticate or authorize the computer 102 with respect to the service/authority 104.

An action 204 comprises installing the configured firmware into the computer 102. This may comprise "burning" the firmware to a hardware component of the computer or computer sub-component. The action 204 may also, or alternatively, comprise physically installing a pre-configured sub-component or other physical element in the computer or computer sub-component. For example, the action 204 may comprise installing a specially-configured network interface 114 into a computer. Such a network interface card may be installed in a computer backplane, as a removable USB device, or by otherwise integrating with or attaching to the computer 102.

An action 206 may comprise booting or initializing the computer 102 using the firmware installed in the action 204. This may comprise executing the firmware upon powering on the computer 102.

FIG. 3 illustrates a process 300 for provisioning a networked computer or other device in an environment such as that shown in FIG. 1, using pre-configured or customized firmware as described above with reference to FIG. 2. In this environment, provisioning comprises configuring or re-configuring a computer for a particular purpose. Provisioning may include providing and installing a hard disk image for the computer, and/or providing other data to be stored on the hard disk or other memory of the computer. Provisioning may further include organizing hard disk data and configuring computer hardware and software components for specialized operation. Provisioning may include installing, re-installing, configuring, and/or securing computer operating systems, applications, and other computer components, as well as defining, configuring, and initiating various tasks to be performed by the computer. Provisioning may include customizing or personalizing the computer in various ways, depending on the functions to be performed by the computer and/or the environment in which it will operate.

In some embodiments, the process 300 may represent the initialization or boot actions that are performed by the computer 102 upon being powered on or first connected to network 118. Thus, the actions of the process 300 may be implemented by computer-executable programs and/or processor instructions within the firmware of the computer 102, such as by the provisioning/authorization logic 126.

An action 302 comprises requesting a local network configuration from a local configuration server (such as a DHCP server). An action 304 comprises receiving the requested local network configuration from the configuration server. The received local network configuration may include an IP address for adoption by the requesting computer 102, as well as other network parameters such as gateway addresses, DNS server addresses, communication parameters, and so forth. The received local network configuration may also specify a provisioning server such as a PXE server, although the requesting computer 102 is configured by way of its firmware to ignore any such indication of a provisioning server.

An action 306 comprises implementing the received local network configuration. This may include initializing network parameters as described above. However, provisioning information, such as PXE information provided by the local configuration server 110, is ignored in favor of the provisioning information that has previously been embedded by way of the provisioning/authorization logic 126.

An action 308 comprises contacting and establishing communications with the service/authority 104 indicated by the embedded service identification 128. Communications between the computer 102 and the service/authority 104 may utilize conventional communications protocols, including PXE protocols, file transfer protocol (FTP), and others. In certain embodiments, the PXE protocol may be configured or extended to use secure protocols such as hypertext transfer protocol secure (HTTPS). Other secure communications protocols may alternatively be employed, either independently or in conjunction with existing provisioning protocols.

An action 310 may comprise identifying and authenticating with the service/authority indicated by the embedded service identification 128, based on the authentication information 130 that has been embedded in the computer firmware. Identifying may include providing a configuration identifier or code to the service/authority 104. Such a configuration code may correspond to a computer, user, customer, or account, and may be used by the service/authority 104 to determine how to respond to provisioning requests. For example, the service/authority 104 may be configured to provision requesting computers differently, depending on their identification as indicated by a provided configuration code. Groups of computers using the same configuration code may be configured or provisioned in the same manner, while different computers, using different configuration codes, may be configured or provisioned differently. In some cases, a computer identification code such as the computer's media access control (MAC) address may be used to form at least part of the computer or provision identification code.

The action 310 may also include authentication between the requesting computer 102 and the service/authority 104. Authentication between these two entities may be unilateral, involving only the authentication of the service/authority 104 or of the provisioned computer 102. Alternatively, the authentication may be bilateral, in which both the computer 102 and the service/authority 104 authenticate themselves to each other.

The authentication action 310 may include the exchange and/or validation of one or more certificates, signatures, credentials, keys, key pairs, and so forth, and may utilize cryptographic elements and techniques. For example, the authentication information 130 may include a public cryptographic key corresponding to a private cryptographic key belonging to the service/authority 104. In order to authenticate the service/authority 104, the service/authority 104 may provide a signature that has been created with the private key, which the computer 102 may validate using the corresponding public key. Similarly, the authentication information 130 may include account credentials that may be submitted to the service/authority 104 to authorize and/or authenticate the computer 102, and which grant the computer 102 privileges with respect to the service/authority 104.

An action 312 comprises provisioning the computer 102 from the service/authority 104. This may involve receiving software, which may include boot routines, drivers, programs, applications, operating systems, scripts, and so forth. Furthermore, the provisioning may be customized based on the identity of the requesting computer 102. In other words, the service/authority 104 may be configured to provide different provisioning information to different computers or groups of computers. For example, the communications between the computer 102 and the service/authority 104 may specify an account and/or group to which the requesting computer 102 belongs. The service/authority 104 may be configured to provision requesting computers in accordance with the accounts or groups to which they belong. This may be useful in situations where the service/authority 104 provides provisioning services to multiple different customers, accounts, and so forth, and/or where different provisioning may be needed for different groups of requesting computers.

An action 314, which may be performed along with the actions 310 and/or 312, comprises registering with the service/authority 104. By registering, the service/authority 104 is given an identification of the computer 102, to record that the computer is authorized to operate using the provisioned configuration. Upon loss, the computer can be unregistered by the service/authority 104. As will be described with reference to FIG. 4, this results in the inability for the computer to receive authorization for continued operations, and may cause the computer to implement security measures.

FIG. 4 illustrates actions that may be performed by the provisioning/authentication logic 126 after the computer 102 has been provisioned. These actions may also be performed upon every startup of the computer 102.

An action 402 comprises attempting to authorize continuing operations of the computer 102 with the service/authority 104. This may include using the authentication information 130 to authenticate with the service/authority 104 and to identify the computer 102 to the provisioning service/authority. The authorization may also include receiving a certificate, acknowledgement, or token from the service/authority 104, indicating that the computer 102 is authorized to continue operations under the current provisioning. The received authorization may in some embodiments indicate a time period for which operations are authorized, such as for a day, a week, a month, etc.

The action 402 may result in an authentication success 404 or an authentication failure 406. Success and failure may be defined in various ways. For example, success 404 may be limited to the condition of having actually communicated with the service/authority 104 and/or receiving an explicit authorization.

Alternatively, success 404 may be defined as anything other than a defined failure, and failure 406 may be predefined as any of a number of different situations. For example, failure 406 may be defined as the inability to authorize with the provisioning authority and/or to receive authorization. Alternatively, failure 406 may be defined as repeatedly failing to obtain explicit authorization, such as the inability to receive authorization for more than a specified threshold, wherein the threshold may comprise a predefined number of computer startups or a predetermined period of time. As yet another alternative, the computer 102 may receive a certificate from the service/authority 104 that indicates a time by which authorization must be renewed. At each attempt 402, the computer 102 may receive a new certificate, indicating an extended time for which operations are authorized. In this situation, failure 406 may consist of reaching the specified expiration time without having received an extension.

The service/authority 104 may maintain a registry of authorized computers. Authorized computers may be registered with the service/authority 104 manually, by a technician, when distributing or provisioning the computers. Alternatively, registration may be part of the automated provisioning process described above. When a computer is reported as lost or stolen, its registration may be removed, causing the service/authority 104 to refuse to authorize the computer in response to the action 402, resulting in a failure 406 to authorize continuing operations of the computer 102.

Upon success 404 in authorizing continuing operations, an action 408 is performed comprising booting the computer 102 with a default operating configuration. That is, the computer is booted into its normal operating state, with whatever privileges and capabilities have been originally authorized for the computer 102 and its user.

Upon a failure 406 to authorize the computer 102, an action 410 comprises implementing security measures 412 to address the possible loss of the computer 102. The security measures 412 may comprise any one or more of various different actions and/or restrictions. For example, the security measures 412 may comprise some type of storage protection with regard to non-volatile storage devices of the computer 102. Storage protection may include denying or limiting access to all or certain parts of the storage 110. Storage protection may further include erasing all or a portion of the non-volatile storage associated with the computer 102. Storage protection may in some implementations comprise physically damaging or destroying all or a portion of the non-volatile storage associated with the computer 102.

Encryption/decryption capabilities of mass storage devices may be utilized in conjunction with storage protection. Specifically, certain storage devices such as hard disks may have integral encryption/decryption capabilities, and may be further configured in accordance with the techniques described herein to attempt to obtain authorization from the service/authority 104 prior to providing decryption services. Upon a failure to obtain such authorization, the storage devices may be configured to either deny decryption services, or to erase protected portions of the storage.

Security measures 412 may comprise some form of boot protection, such as refusing to boot the computer 102 or to continue the boot process. Thus, upon failure 406 to obtain continuing authorization the computer may become non-functional, thereby protecting any data and functionality that might otherwise be exposed.

Security measures 412 may comprise communications protection. For example, a network interface of the computer 102 may be disabled or its capabilities might be limited. This might be particularly appropriate when the provisioning/authorization logic is located in the firmware of the network interface. In this situation, the network interface, upon startup, may attempt to obtain authorization from the service/authority 104, and upon failure to receive such authorization may limit its future communications to certain types of traffic or to certain other network entities.

The security measures 412 may also include activating remote reporting techniques. For example, the computer 102 may be allowed to boot, but may be monitored and any activities performed on the computer may be reported surreptitiously to the service/authority 104 or to some other monitoring entity. This may allow identification of the person or entity that currently possesses the computer 102. Monitoring may include location monitoring, such as by using geographic sensing capabilities of the computer to report current locations of the computer. Monitoring may also include photographic monitoring, such as by capturing images with a computer's integral camera and sending the captured images back to the service/authority 104. Other types of monitoring may also be used, such as reporting keystrokes, browsing history, viewed content, and so forth.

Combinations of the security measures 412 may be implemented. For example, the security measures 412 may include erasing or denying access to certain parts of storage, allowing the computer to boot in an otherwise normal fashion, and also implementing reporting.

The various activities, protections, measures, and functionality described above, including portions of the provisioning/authorization logic 126, may be distributed among various components of the computer 102, particularly among the different firmware of the computer. The firmware itself may be configured in such a way that it is tamper-proof, tamper-resistant, and/or tamper-evident, so that it is impractical for someone in possession of the computer to alter the computer hardware. Furthermore, the provisioning/authorization logic 126 may be physically integrated with the encryption/decryption capabilities of a storage device, so that it becomes impractical to bypass the security-related functionality described above without destroying or breaking the encryption/decryption capabilities of the storage device.

Figure 5:
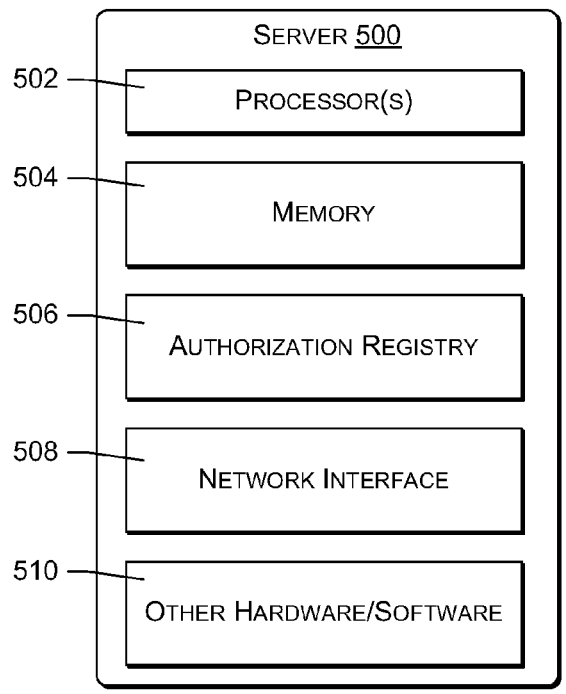
FIG. 5 is a block diagram illustrating relevant elements of a server that may be used to implement one or more or the services described herein.

FIG. 5 illustrates relevant components of a server 500 that may be used to implement the functionality of the service/authority 104. Generally, the service/authority 104 may be implemented by one or more servers, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises. In some implementations, a service may offer only a portion of the functionality described above, such as either the provisioning services or the authorization services.

For purposes of discussion, the functionality of the service/authority 104 is described as being implemented by the single server 500. In a very basic configuration, the example server 500 might comprise a processing unit 502 composed one of one or more processors, and memory 504. The memory 504 may comprise computer storage media and may include volatile and nonvolatile memory. Thus, the memory 504 may include, but is not limited to, RAM, ROM, EEPROM, flash memory, or other memory technology, or any other medium which can be used to store media items or applications and data which can be accessed by the server 500.

The memory 504 may be used to store any number of functional components that are executable on the processing unit 502, as well as data that is supplied to requesting computers during provisioning. Functionality components (not shown) may include an operating system, a web services component, application program interfaces (APIs) and various other components as may be appropriate to implement the functionality described above.

The server 500 may maintain or have access to an authorization registry 506, indicating or identifying those computers that are authorized for continuing operation. When a computer requests authorization in the action 402 of FIG. 4, the server 500 may reference the authorization registry 506 to determine whether such authorization should be granted. When a computer is lost or stolen, it may be removed from the registry 506 to indicate that it is to be disabled or otherwise subject to security measures.

The server 500 may of course include many other logical, programmatic, and physical components, of which those shown in FIG. 5 are merely examples that are related to the discussion herein. As an example, the server 500 may have a network interface 508 for communicating over the network 118. Other hardware and software components of the server 500 are represented by block 510 of FIG. 5, and may include the usual components of a network-accessible server.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
    receiving, from a provisioning authority that is identified in boot firmware of a computer, a disk image;
    installing the disk image on non-volatile storage of the computer; and
    executing authorization logic from the boot firmware upon startup of the computer, the authorization logic being configured upon execution to perform actions comprising:
        periodically contacting, at recurring periods of time, the provisioning authority to authorize continuing operations of the computer with the provisioning authority;
        upon successfully authorizing continuing operations of the computer, starting an operating system from the disk image with a default configuration; and
        upon a defined failure to authorize continuing operations, implementing security measures.

2. The method of claim 1, further comprising registering the computer with the provisioning authority, the registering indicating that the computer is authorized for the continuing operations; and
    upon a determination that the computer has been deregistered with the provisioning authority, implementing the security measures.

3. The method of claim 1, wherein the defined failure comprises repeatedly failing to authorize continuing operations with the provisioning authority.

4. The method of claim 1, wherein the defined failure comprises failing to authorize continuing operations over a predefined period of time.

5. The method of claim 1, wherein the security measures comprise denying access to the non-volatile storage of the computer.

6. The method of claim 1, wherein the security measures comprise refusing to boot the operating system.

7. The method of claim 1, wherein the security measures comprise erasing at least a portion of the non-volatile storage associated with the computer.

8. The method of claim 1, wherein the security measures comprise activating remote reporting from the computer.

9. The method of claim 1, wherein the periodically contacting, at the recurring periods of time, the provisioning authority to authorize comprises cryptographic authentication between the computer and the provisioning authority.

10. The method of claim 1, further comprising:
    validating an identity of the provisioning authority; and
    initiating the installation of the disk image after the validating the identity of the provisioning authority.

11. The method of claim 1, further comprising:
    authenticating between the computer and the provisioning authority prior to initiating the installation of the disk image, the authenticating based on authentication information in the boot firmware; and
    wherein the periodically contacting, at the recurring periods of time, the provisioning authority to authorize comprises cryptographic authentication between the computer and the provisioning authority.

12. The method of claim 1, wherein the disk image is customized based on an identity of the computer.

13. The method of claim 1, wherein the defined failure comprises failing to authorize continuing operations after a predefined number of attempts to authorize continuing operations of the computer with the provisioning authority.

14. The method of claim 1, wherein the boot firmware comprises firmware of a network interface card of the computer.

15. The method of claim 1, wherein the boot firmware comprises firmware of a storage controller of the computer.

16. The method of claim 1, wherein the boot firmware comprises firmware associated with a storage device of the computer.

17. A computer, comprising:
    one or more processors; and
    computer boot memory including instructions that are executable upon startup of the computer by the one or more processors to perform actions comprising:
        requesting provisioning software from an operations authority that is identified in the computer boot memory;
        receiving the provisioning software from the operations authority;
        provisioning the computer by configuring the computer with the provisioning software;
        periodically contacting, upon each startup of the computer, the operations authority to authorize continuing operations of the computer with the operations authority;
        upon successfully authorizing continuing operations of the computer, starting up the computer with a default configuration; and
        upon a defined failure to authorize continuing operations, implementing security measures.

18. The computer of claim 17, wherein the computer boot memory comprises a computer Basic Input/Output System (BIOS).

19. The computer of claim 17, wherein the computer boot memory comprises firmware of a computer subcomponent.

20. The computer of claim 17, wherein the computer boot memory further includes an identification of the operations authority, the identification comprising at least one of an Internet Protocol (IP) address or a Uniform Resource Locator (URL).

21. The computer of claim 17, wherein the computer boot memory indicates an identification of the operations authority and information for authenticating with the operations authority.

22. A computer device comprising:
    one or more processors; and
    firmware including instructions that are executable by the one or more processors to perform actions comprising:
        periodically communicating, at recurring periods of time, with a remote operations authority to authorize continuing operations;

upon receiving authorization from the remote operations authority, allowing continuing operations of the computer device; and upon failing to receive authorization from the remote operations authority for more than a predefined threshold, disabling the computer device.

23. The computer device of claim 22, wherein the disabling comprises limiting functionality of the computer device.

24. The computer device of claim 22, wherein the disabling comprises erasing storage associated with the computer device.

25. The computer device of claim 22, wherein the disabling comprises denying access to storage associated with the computer device.

26. The computer device of claim 22, wherein the disabling comprises physically damaging storage associated with the computer device.

27. The computer device of claim 22, wherein the firmware specifies the remote operations authority.

28. The computer device of claim 22, the actions further comprising, after each periodic communication and upon receiving the authorization from the remote operations authority, receiving a certificate from the remote operations authority indicating a time by which authorization is to be renewed in order to continue operations of the computer device.

\* \* \* \* \*